June 14, 1949.    J. N. WOLFRAM    2,473,119
COUPLING FOR FLARELESS TUBES
Filed Nov. 13, 1944

Inventor
John N. Wolfram
By Mason, Porter & Diller
Attorneys

Patented June 14, 1949

2,473,119

UNITED STATES PATENT OFFICE 2,473,119

COUPLING FOR FLARELESS TUBES

John N. Wolfram, Cleveland, Ohio, assignor to The Parker Appliance Company, Cleveland, Ohio, a corporation of Ohio Application November 13, 1944, Serial No. 563,172

1 Claim. (Cl. 285—122)

The invention relates to new and useful improvements in a coupling for flareless tubes.

An object of the invention is to provide a coupling wherein the tube is gripped and held in the coupling by a clamping sleeve which clamping sleeve is also so constructed that when forced endwise of the coupling, it will be bowed so as to press against the tube at a distance back from the end thereof for damping vibrations in the tube.

A further object of the invention is to provide a coupling of the above type wherein the sleeve is relatively long and thin and is provided with an outwardly tapering portion at the rear end so dimensioned and disposed that endwise pressure against the sleeve will cause it to bow inwardly at the inner end of the taper for clamping the tube to dampen vibrations, and will cause the sleeve to bow outwardly between said tapered portion and the inner end of the sleeve so as to cause the nose end thereof to bite into the tube and grip the same.

These and other objects will in part be obvious and will in part be hereinafter more fully disclosed.

In the drawings—

Figure 1:
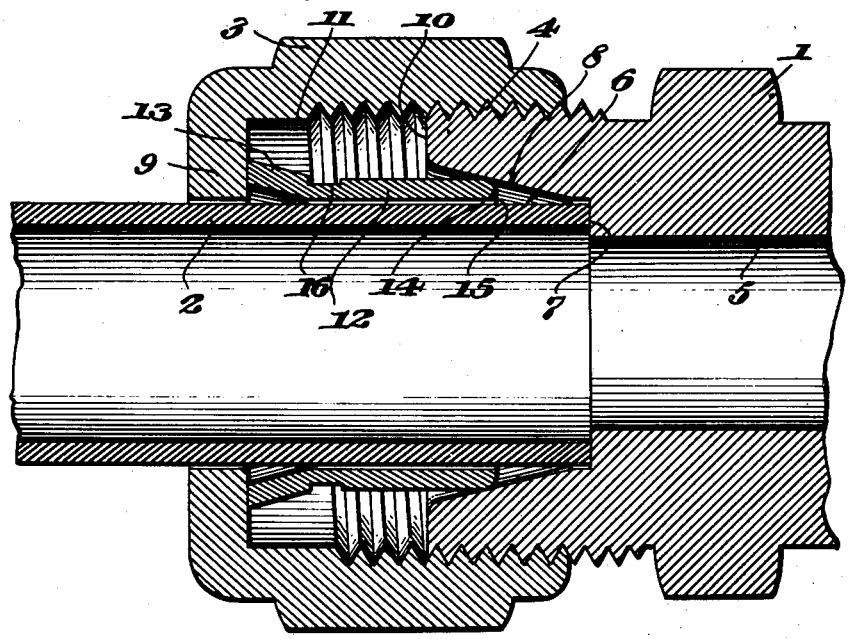
Figure 1 is a longitudinal sectional view of a coupling embodying the improvements with the nut turned into finger-tight engagement with the body member.

In the drawings the coupling includes a body member 1 which is adapted to be connected to any fixed part to which the tube is to be joined. The tube is indicated at 2 and is of the flareless type. Cooperating with the body member is a nut 3. The nut and tube have a threaded connection indicated at 4. While the nut is shown as having a threaded connection with the exterior of the body member 1, it will be understood, of course, that it may be otherwise formed. The body member 1 is provided with a bore 5 therethrough. It is also counter-bored as indicated at 6. These bores are so dimensioned as shown in the present illustrated embodiment of the invention, as to provide a shoulder 7 against which the end of the tube seats. The counter-bore 6 is shaped so as to provide a relatively long gradually tapered camming surface 8. This surface tapers outwardly to the open end of the counter-bore.

The nut 3 is provided with an inwardly extending flange 9 which is spaced away from the end 10 of the body member, thus providing a recess 11. A clamping sleeve 12 is disposed in the recess 11 and extends for some distance into the counter-bore 6. This clamping sleeve 12 is relatively long and of comparatively thin metal. It includes a cylindrical portion and an outwardly tapered portion. The outwardly tapered portion is indicated at 13. The outer end of this tapered portion 13 abuts against the flange 9 of the nut. The inner end of this sleeve 12 is rounded as indicated at 14 so as to provide a relatively sharp cutting edge 15 at the inner face of the inner end thereof. The sleeve is preferably provided with an annular recess 16 disposed in the cylindrical portion at the inner end of the tapered section 13.

Figure 2:
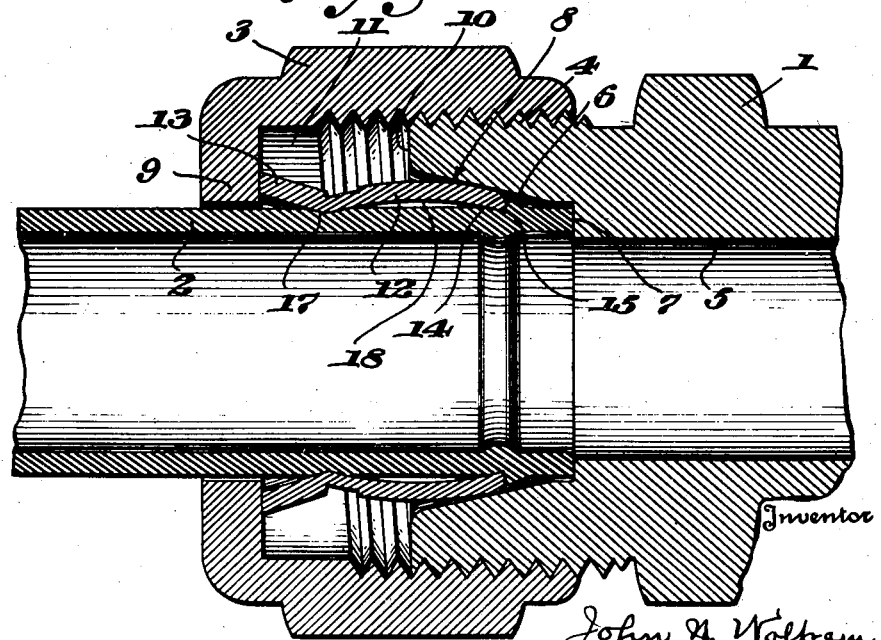
Figure 2 is a view similar to Figure 1 but showing the nut fully tightened and the tube gripped by the clamping sleeve.

When the nut is closed, it will press against the end of this clamping sleeve and will force the clamping sleeve against the camming surface on the body member. Two things are accomplished by this endwise pressure against the sleeve. The sleeve is bowed at the portion thereof where the tapered portion joins the cylindrical portion. This bowed portion is indicated at 17 in Figure 2 and extends, of course, all the way around the tube, and the bowing of the sleeve contracts the sleeves so that it firmly grips the tube well back from the inner end thereof and this provides a pressure against the tube which dampens vibrations in the tube. The endwise pressure against the sleeve which, as stated, is relatively thin, will cause it to bow outwardly as indicated at 18. This outward bowing of the sleeve between the tapered portion and the inner end of the sleeve will position said inner end so that the cutting edge 15 will dig into the tube and form a clamping shoulder as the tube rests against the seat 7 and is held from endwise movement during this closing of the coupling.

This reaction of the coupling members on the sleeve provides a very firm grip between the sleeve and the tube which will hold the tube in the coupling and prevent it from being pulled out of the coupling. It also provides a seal between the sleeve and the tube where the sleeve fits into the tube and also a seal between the sleeve and the body member where the sleeve makes contact with the camming surface.

While it is preferred to form the sleeve with an annular recess, this is solely for the purpose of assisting the sleeve in bowing, and a fairly good clamping of the sleeve against the tube can be accomplished without this recess.

While it is preferred to use a shoulder in the body member so that the tube seats against the same and is held from endwise movement, this seating shoulder may be omitted, in which case when the sleeve is moved along the camming surface, the tube will move with it, but as the sleeve is contracted it will form a firm gripping engagement with the tube which will not only seal the connection between the tube and the sleeve, but will also grip the tube so that it will be firmly held in the coupling.

It is obvious that changes in the details of construction can be made without departing from the spirit of the invention as set forth in the appended claim.

I claim:

A coupling for flareless tubes comprising a body member and a nut having a threaded connection, said body member having a bore to receive the end of the tube with the wall of the bore tapering outwardly toward the open end thereof to form a camming surface, said nut having an inwardly projecting flange at its outer end which is spaced from said body member to provide a recess, a clamping sleeve disposed in said recess and extending into the bore and contacting with said camming surface, said clamping sleeve having near the outer end thereof an annular recess in its outer face, said sleeve being uniformly tapered from said recess outwardly with the end thereof abutting against the flange of the nut whereby pressure of the nut against the flared end will cause the sleeve to contract inwardly at the inner end of the tapered portion and at the outer portion of the recess for firmly contacting the tube for damping vibrations therein, the inner end of said sleeve when forced along the camming surface being contracted into tight gripping engagement with the tube for holding the same in the coupling.

JOHN N. WOLFRAM.

REFERENCES CITED

The following references are of record in the file of this patent:

UNITED STATES PATENTS

| Number | Name | Date |
|---|---|---|
| 1,307,540 | Dohner | June 24, 1919 |

FOREIGN PATENTS

| Number | Country | Date |
|---|---|---|
| 86,771 | Sweden | July 7, 1936 |
| 540,088 | Great Britain | Oct. 6, 1941 |